US006323566B1

(12) United States Patent
Meier

(10) Patent No.: US 6,323,566 B1
(45) Date of Patent: Nov. 27, 2001

(54) TRANSPONDER FOR REMOTE KEYLESS ENTRY SYSTEMS

(75) Inventor: Herbert Meier, Moosburg (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/728,844

(22) Filed: Oct. 10, 1996

(51) Int. Cl.[7] ........................................ H04Q 7/10

(52) U.S. Cl. ........................ 307/10.2; 180/287; 340/539; 340/825.31; 340/825.69

(58) Field of Search ................................ 307/10.1, 10.2; 340/825.69, 825.72, 539, 426, 825.31; 180/287

(56) References Cited

U.S. PATENT DOCUMENTS 5,523,746 * 6/1996 Gallagher ........................ 340/825.31
5,583,486 * 12/1996 Kersten ........................ 307/10.2
5,744,874 * 4/1998 Yoshida et al. .................... 307/10.1
5,757,086 * 5/1998 Nagashima ........................ 307/10.6

FOREIGN PATENT DOCUMENTS 44 09 559 6/1995 (DE) .
43 29 697 A 1/1996 (DE) .
0 659 963 A 6/1995 (EP) .
0 690 190 A 1/1996 (EP) .
767 286 A 4/1997 (EP) .

* cited by examiner

*Primary Examiner*—Albert W. Paladini
(74) *Attorney, Agent, or Firm*—Wade James Brady, III; Frederick J. Telecky, Jr.

(57) ABSTRACT

A road vehicle keyless entry system (10) having an in-vehicle communication processor (11) and a remote transponder (15) is provided. The communication processor (10) has a radio frequency receiver (12), a low frequency transmitter/receiver (13) and a controller (14) capable of encrypting and reading the signals sent and received by the low frequency transmitter/receiver (13). The transponder (15) has a radio frequency transmitter (16) that transmits a signal to the communication processor (11) upon receipt of a manual stimulus and a low frequency transmitter/receiver (17) capable of reading and responding to encrypted signals received from the communication processor (11).

23 Claims, 5 Drawing Sheets

TRANSPONDER FOR REMOTE KEYLESS ENTRY SYSTEMS

BACKGROUND OF THE INVENTION

This invention relates to the field of compact, radio frequency (RF) transponders of the type known to be useful in systems for security and information storage, access control, entry validation and identification, and in other comparable systems. Such a system requires an interrogator circuit built into a road vehicle or building, for example, and a remote transponder which incorporates transmitting and receiving circuits in a compact case that may be carried by a person in a key, a key fob, a badge, a tag or in any similar miniaturized housing. More particularly this invention relates to a transponder in a road vehicle or automotive remote keyless entry and immobilization system which is functional over an increased range in active and passive modes of operation. This invention further relates to a transponder which utilizes a secure challenge-response encryption technique to provide greater security for the user.

Compact passive low frequency transponders, using a frequency of 134.2 kilohertz (134.2 kHz), for example, for passive entry and immobilizer functions and radio frequency remote control transmitters, using a frequency of 433 megahertz (433 MHz), for example, for use in remote keyless entry and security systems for automobiles are generally known. These systems allow access to the automobile without the use of battery power, if the transponder is used in close proximity to the interrogator, and allow the operator to transmit commands such as locking and unlocking doors, hood and trunk, controlling vehicle lighting and ignition, and arming and disarming the anti-theft security system to the vehicle over greater distances. The transponders used may employ an interrogator-responder arrangement with an EEPROM data storage device and a small capacitor that serves as an energy accumulator, charged by the energy provided by the radio frequency interrogation, to provide power for the transponder. The transponder is, thus, sufficiently small to supplement or replace a conventional vehicle door and ignition key. Such a transponder is disclosed in Schuermann et al., U.S. Pat. No. 5,053,774, which is incorporated herein by reference.

However, the transponder systems in current use generally have a limited operating range. Current remote control transponder systems require battery power for proper operation and are not functional, in a passive mode, that is, when operated without a battery.

SUMMARY OF THE INVENTION

The present invention provides a road vehicle remote keyless entry system which is functional over an increased range in the active and passive modes of operation while increasing security by the use of a secure challenge-response encryption technique. A road vehicle keyless entry system having an in-vehicle communication processor and a remote, miniaturized transponder is provided. The communication processor has a radio frequency receiver, a low frequency transmitter/receiver and a controller capable of sending and receiving signals via the low frequency transmitter/receiver and receiving signals via the radio frequency receiver. The transponder has a radio frequency transmitter that transmits a signal to the communication processor upon receipt of a manual stimulus and a low frequency transmitter/receiver capable of reading the signals received from the communication processor and preparing an encrypted response for transmission to the communication processor. When the transponder provides an encrypted response containing the correct vehicle code to the communication processor, the communication processor authorizes the desired operation such as, for example, locking or unlocking the car, arming or disarming the anti-theft alarm system or the performance of vehicle related initialization functions such as seat, seat belt and vehicle mirror adjustments and lighting the vehicle interior lights.

The present invention further provides a secure road vehicle keyless entry system comprising an in-vehicle communication processor and a remote transponder. The communication processor and transponder communicate in parallel paths, a first path being a radio frequency transmission from the transponder to the communication processor and a second path being a low frequency, encrypted two way transmission between the transponder and the communication processor. The radio frequency transmission and the low frequency, encrypted transmission can be compared by the communication processor for authentication of the transmitted data or command before the communication processor authorizes the desired operation and, if one communication channel is affected by interference, the second communication channel may be used as a backup.

It is further contemplated that the radio frequency receiver in the communication processor and the radio frequency transmitter in the transponder may be transmitter/receivers, each capable of performing both the receiving and transmitting functions. When radio frequency transmitter/receivers are used, both the radio frequency communication and the low frequency communication between the communication processor and the transponder will be two way transmissions used to transmit data between the two devices.

DETAILED DESCRIPTION OF PREFERRED EMBODIMENT

In the road vehicle keyless entry system of the present invention the immobilization function, which locks the vehicle and initiates operation of the alarm system, is separate from the remote keyless entry function, which, for example, resets the alarm system and authorizes unlocking the vehicle and performance of vehicle related initialization functions such as seat, seat belt and vehicle mirror adjustments and lighting the vehicle interior lights.

Figure 1:
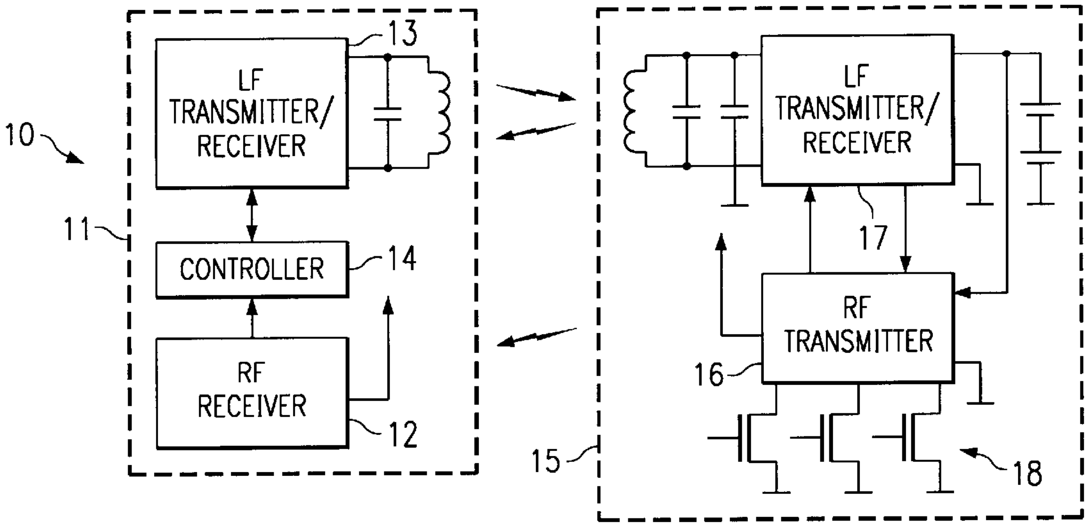
FIG. 1 is a block schematic illustrating the functional elements and data paths of one embodiment of the road vehicle keyless entry system of the present invention.

Turning to the drawings, FIG. 1 illustrates the functional elements and data paths of one embodiment of the road vehicle keyless entry system of the present invention. In this disclosure, the term road vehicle means all of the various types of vehicles that are operated upon the highway system including, but not limited to, automobiles, trucks, vans, motorcycles, buses and motorhomes. It is intended that the arrangement shown in FIG. 1, and in the following figures, shall be interpreted as an illustrative system configuration and that other possible configurations, more adapted to the specific user needs, exist within the scope of the disclosure herein. Further, the use of like reference numbers to identify components within the various figures indicates the presence of similar elements within each of the different figures.

The road vehicle keyless entry system, generally designated as 10, includes a communication processor 11 that is located within the vehicle and a remote, miniaturized transponder 15. Communication processor 11 may also be named an interrogator or called by other names indicating its function as a unit which requests and receives information from the remote transponder 15. Communication processor 11 has a radio frequency receiver 12, a low frequency transmitter/receiver 13 and a controller 14 which is capable of sending and receiving signals via the low frequency transmitter/receiver 13 and receiving signals via the radio frequency receiver 12. Controller 14 combined with low frequency transmitter/receiver 13 is preferably, and may be referred to as, a TIRIS reader, the term TIRIS being an acronym known to those skilled in the art as denoting certain types of devices or equipment utilizing the transponder arrangement and TIRIS reader disclosed in Schuermann et al., U.S. Pat. No. 5,053,774. The transponder 15 has a radio frequency transmitter 16 that transmits a signal to communication processor 11 upon receipt of a stimulus manually produced by an operator's actuation of one of a plurality of push buttons 18. While push buttons 18 are shown for convenience, any manually operatable, pulse creating switch such as, for example, a toggle switch or a rotary switch may be used. Transponder 15 also has a low frequency transmitter/receiver 17 capable of reading signals received from communication processor 11, preparing an encrypted response and transmitting the encrypted response to communication processor 11.

In the present embodiment of the invention, communication processor 11 located within the vehicle and remote transponder 15 communicate with one another to permit a flow of information to initiate operations at the vehicle. Communication between the two devices is initiated by the vehicle operator who pushes a button 18 on transponder 15 which responds by transmitting a radio frequency (RF) signal to communication processor 11 and a signal to low frequency transmitter/receiver 17 to prepare it for interrogation by communication processor 11. The signal transmission, using a rolling code for security, is a one way communication or data transfer from transponder 15 to communication processor 11 using a radio frequency signal of 433 megahertz (433 MHz), for example, or another suitable frequency. In response to the initial signal from transponder 15, communication processor 11 transmits a low frequency interrogation to transponder 15 requesting identification and verification of the original radio frequency signal. Thus, the low frequency communication between the devices, using a low frequency signal such as, for example, 134.2 kilohertz (134.2 kHz), is a two way data exchange using the challenge-response principle for authentication or verification of identity. Security of the low frequency signal is maintained by using an encryption key which is known only to communication processor 11 in the vehicle and remote transponder 15. When transponder 15 provides an encrypted response containing the correct vehicle code to communication processor 11 in repose to the interrogation, communication processor 11 authorizes the desired operation within the vehicle. This use of encryption logic and interrogation and response via the low frequency data transmission, in addition to the rolling code used for security with the radio frequency signal, greatly increases the security of the road vehicle keyless entry system.

In the description above, a radio frequency transmitter and a receiver are used. It is further contemplated that radio frequency receiver 12 in communication processor 11 and radio frequency transmitter 16 in transponder 15 may be transmitter/receivers, each capable of performing both the receiving and transmitting functions. When radio frequency transmitter/receivers are used, both the radio frequency communication and the low frequency communication between communication processor 11 and transponder 15 will be two way transmissions used to transmit data between the two devices. This use of two way radio frequency communication is illustrated by the solid and dotted signal lines between radio frequency receiver 12 and radio frequency transmitter 16.

Figure 2:
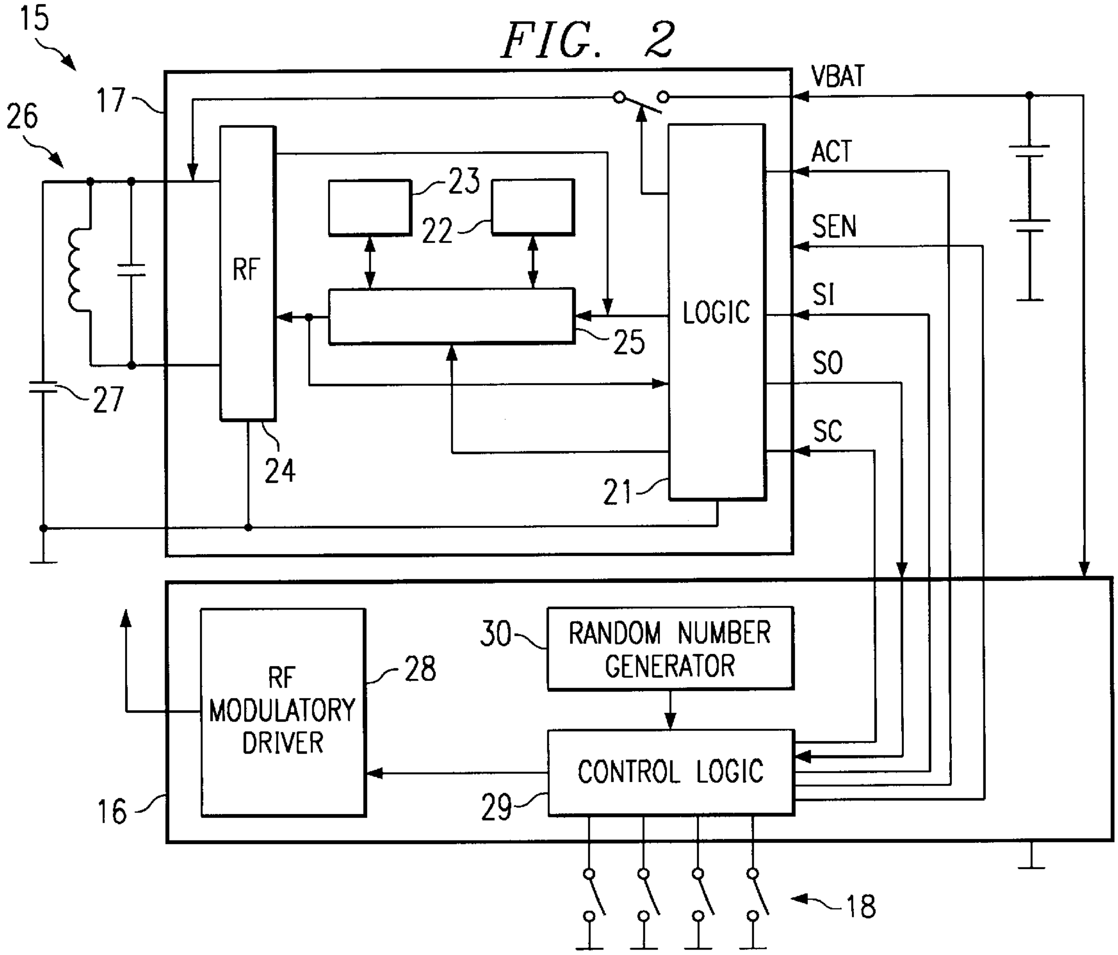
FIG. 2 is a block schematic illustrating the functional elements and data paths of the remote transponder of this embodiment of the invention.

FIG. 2 is a block schematic of the functional elements and data paths of remote transponder 15 of this embodiment of the invention showing radio frequency transmitter 16 and low frequency transmitter/receiver 17. For remote security functions such as, for example, turning on the interior vehicle lights or arming or disarming the security system a functional range of greater than 10 meters is desired. For this purpose, transponder 15 includes radio frequency transmitter 16 which operates at a frequency of 433 megahertz (433 MHz) using a rolling code for security. The present transponder 15 further includes low frequency transmitter/receiver 17 which provides a two way exchange of data with the communication processor 11 in the vehicle using an encrypted signal having a frequency of 134.2 kilohertz (134.2 kHz). Use of low frequency transmitter/receiver 17 allows access to, or enables, additional features such as, for example, programming, the exchange and verification of identification and the use of encryption logic and the transmission of various desired commands to the vehicle, all of which can significantly increase the security of the road vehicle remote keyless entry system.

A vehicle operator provides a manual stimulus at the remote transponder 15 to initiate a command—the operator pushes one of the plurality of switches or push buttons 18 to indicate the action desired at the vehicle. Transponder 15 includes radio frequency transmitter 16 which includes control logic module 29, radio frequency modulator/driver 28 and random number generator 30. In response to the operator's action, radio frequency transmitter 16 transmits a signal, the desired command, to radio frequency receiver 12 in communication processor 11 at the vehicle and simultaneously transfers the command to low frequency transmitter/receiver 17 via the serial interface. For receipt of this command signal, power to passive, low frequency transmitter/receiver 17 is provided by battery at terminal ACT on the control logic module 21 and data are received using clock and data input ports, terminals SC and SI. In addition to the control logic module 21, low frequency transmitter/receiver 17 includes encryption logic module 22, memory 23, radio frequency circuitry 24, shift register 25, tuned antenna, a parallel resonant circuit, 26 and charge or power capacitor 27. Low frequency transmitter/receiver 17 transmits the remote command to low frequency transmitter/receiver 13 which was switched to the receive mode by controller 14 when radio frequency receiver 12 detected the carrier and command signal from radio frequency transmitter 16. Thus, even if external influences create interference with the radio frequency transmission of the desired command, the command may be received by communication processor 11 through the use of low frequency transmission signals although the transmission range for the low frequency signal is reduced. Authentication of the command may be confirmed by control processor 11 transmitting a challenge to the transponder 15 using low frequency transmitter/receiver 13. When the challenge is received by low frequency transmitter/receiver 17, the encryption logic module 22 encrypts the challenge using the encryption key stored within memory 23 (not readable) and transfers the encrypted challenge and a serial number, which is also stored within memory 23, to the radio frequency transmitter 16. The encrypted challenge and serial number, together with the repeated command, are transmitted in parallel to communication processor 11 by both radio frequency transmitter 16 and low frequency transmitter/receiver 17 as a complete response to the challenge to authenticate the first command transmission. Controller 14 executes the command, or authorizes other devices to execute the command, if the correct vehicle code or signature is received in response to the challenge. With bidirectional communication using the low frequency transmitter/receivers 13 and 17, the challenge-response feature provides greatly increased security over the rolling code system. It is now also possible to transmit additional data or programming information between the remote transponder 15 and the communication processor 11 using the low frequency transmitter/receiver 17.

As discussed above, it is further contemplated that the radio frequency receiver 12 in communication processor 11 and radio frequency transmitter 16 in transponder 15 may be transmitter/receivers, each capable of performing both the receiving and transmitting functions. When radio frequency transmitter/receivers are used, both the radio frequency communication and the low frequency communication between communication processor 11 and transponder 15 will be two way transmissions used to transmit data between the two devices.

For remote keyless entry, a function or transmission range of at least approximately one meter (1 m) is necessary. However, this range is difficult to reach with passive transponders, even when the transponder has an antenna the size of a credit card. Therefore, an active function may be provided by the inclusion of a battery as shown in FIG. 3, a block schematic of a low frequency transmitter/receiver 50, another embodiment of the low frequency transmitter/receiver 17 for remote transponder 15.

Figure 3:
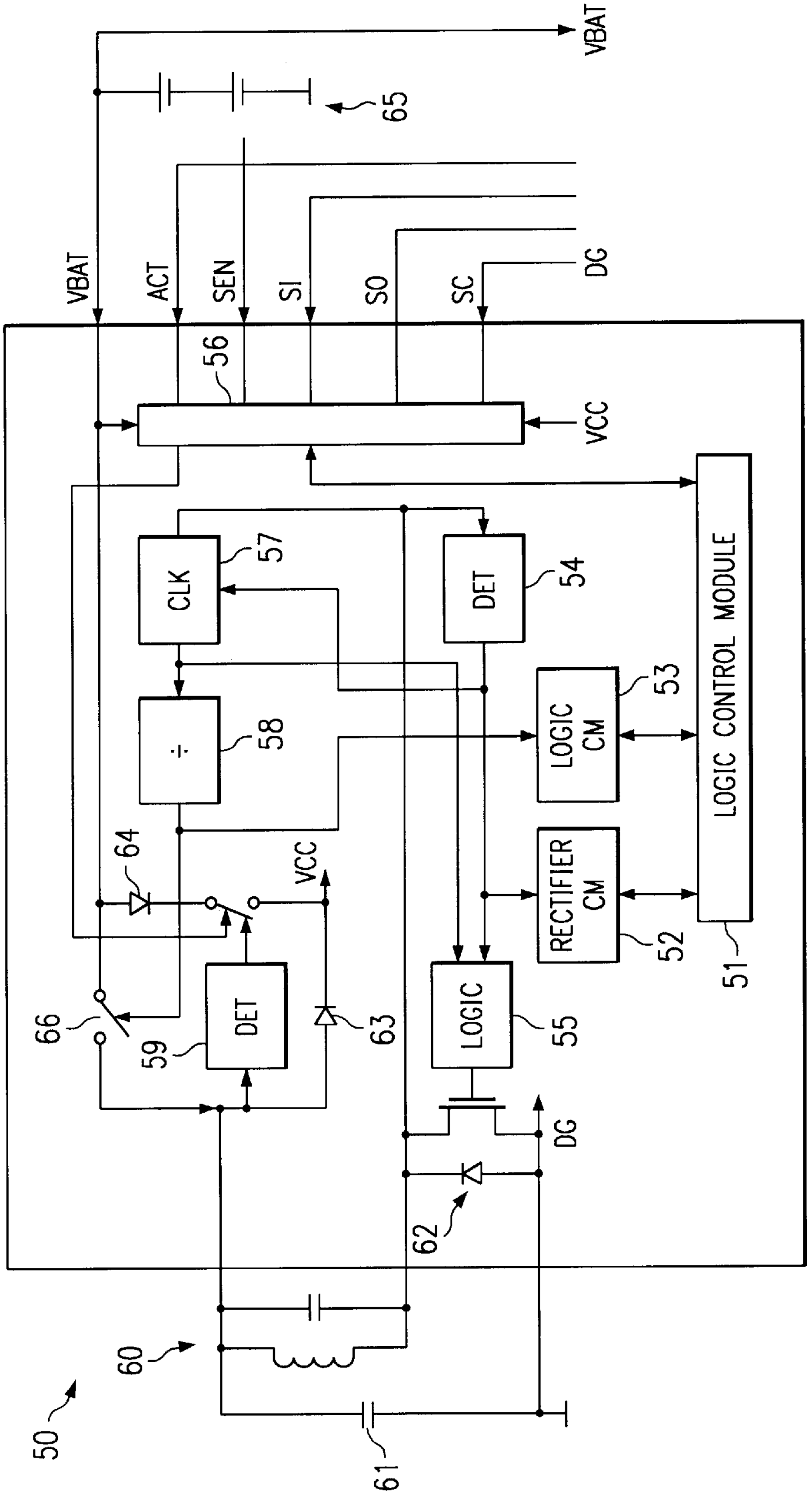
FIG. 3 is a block schematic illustrating the low frequency transmitter/receiver of the remote transponder of this embodiment of the invention.

Low frequency transmitter/receiver 50 includes logic control module 51, receiver control module 52, transmitter control module 53, the end of burst detector 54, the adaptive pluck logic module 55, signal level converter 56, clock regenerator 57, divider 58, threshold detector 59, resonant circuit 60, charge capacitor 61 and diodes 62, 63 and 64 connected as shown in FIG. 3. Resonate circuit 60 has a capacitor connected in parallel with an inductor with the value of each component selected to provide a resonant circuit that is resonant at a radio frequency of 134.2 kilo hertz (134.2 kHz). The size of charge capacitor 61 is selected so that the fully charged capacitor will have sufficient charge to provide the power necessary to enable the low frequency transmitter/receiver 50 to function properly. A capacitor sufficiently large would be, for example, a capacitor of approximately 0.12 microfarads (0.12 $\mu$f). Diodes 62, 63 and 64 are symbols for the necessary one way function, that is, the signal is conducted in only one direction. Diodes 62, 63 and 64 are preferably Schottky diodes with low feed through voltage, if possible in the selected semiconductor process, although they may be normal semiconductor diodes such as 1N4148 diodes or field effect transistor (FET) circuits using switched gates.

The vehicle operator initiates a command by providing a manual stimulus at the door handle of the vehicle or with remote transponder 15—the operator operates the door handle or pushes one of the plurality of switches or push buttons 18 to indicate the action desired at the vehicle. After receipt of a radio frequency signal from transponder 15, the communication processor 11 or interrogator transmits a low frequency signal (134.2 kHz) to low frequency transmitter/receiver 50 which, when received by resonant circuit 60, provides electrical energy to charge charge capacitor 61 in addition to asking transponder 15 for confirmation of the command or action request. The low frequency voltage is rectified by diode 62 and charges charge capacitor 61. The voltage level reached on charge capacitor 61 depends upon the distance between the communication processor 11 and the transponder 15 antennas which are typically resonance circuits having a high quality factor such as, for example, resonant circuit 60. If sufficient energy is accumulated so that the voltage on charge capacitor 61 exceeds a certain limit such as one volt, for example, the threshold detector 59 switches the battery supply voltage from battery 65, provided at terminal VBAT, to connect the battery voltage through connections VCC to the logic circuitry of low frequency transmitter/receiver 50. The threshold detector 59 prevents discharge of battery 65 when transponder 15 is in the presence of electromagnetic interference such as, for example, if the transponder is placed upon a television set. If the voltage limit on charge capacitor 61 is low, the influence of the interference will increase, but the sensitivity (the signal detection range) will also increase. As explaned hereinafter, the threshold detector 59 may be an active or a passive device. Increasing the sensitivity requires more stand-by current from battery 65, with a resulting decrease in battery life. The threshold detector may also be located at the radio frequency signal input where higher signal amplitudes are normally available. If battery 65 is not available, voltage is still provided to the logic circuitry by charge capacitor 61 through diodes 63 and 64. The resonant circuit 60 is separated from the integrated circuit power supply during the reception of data, the write phase, from the communication processor 11. The signal received by transponder 15 and the level of oscillation of the resonant circuit 60 is usually low when the distance between the communication processor 11 and the transponder 15 is great. The use of battery 65 to provide voltage to the circuit enables the low frequency transmitter/receiver 50 circuit to receive and react to transmitted signals having lower amplitudes than would be possible in the passive mode of operation, that is, without battery power. Voltage is monitored by the end of burst detector 54. When the amplitude of the voltage signal drops and the resonant circuit 60 resonates with its own frequency instead of being enhanced by the signal from communication processor 11, the end of burst detector 54 activates clock regenerator 57 and the pluck logic module 55 which preferably provides peak pluck and slope control. The pluck logic module 55 enhances oscillation whenever a voltage amplitude drop caused by the resonant circuit loss factor is detected. Pluck logic, the pluck logic module 55 and the peak detector used in pluck logic are described in U.S. Pat. Nos. 5,283,529, 5,227,740 and 5,126,745, the disclosures of which are hereby incorporated herein by reference.

The provision of battery power enables the circuit to operate properly with the reception of a lower signal amplitude than would be possible in the passive mode. Voltage amplitude drops during and after the write phase are detected by the end of burst detector 54 over greater distances because internal current sources and digital circuits of low frequency transmitter/receiver 50 are already fully functional as battery 65 provides the necessary power rather than relying upon the signal received by charge capacitor 61 to provide power, as would be required in the passive mode of operation. The low frequency transmitter/receiver 50 is able to regenerate even small signal amplitudes which helps pluck circuit 55 enhance the oscillation during the free running times, during the reception of write signals and during the transmission of response data. Thus, the distance over which data may be received by transponder 15 using pulse width modulation is significantly enhanced when compared to the distance possible when a transponder operating in the passive mode is used.

After a period for the charging of charge capacitor 61, communication processor 11 transmits a challenge such as, for example, a random number to transponder 15. This challenge is received by low frequency transmitter/receiver 50 and is encrypted, using the encryption key stored in its memory, to become the signature of the transponder 15. This generated signature, the encrypted random number, and the serial number of transponder 15 are transmitted to the communication processor 11 by the low frequency transmitter/receiver 50 and, at the same time, transferred to radio frequency transmitter 16 of transponder 15 using the internal serial input/output interface circuitry. When the internal serial input/output interface circuitry is used without low frequency transmitter/receiver 13 being involved so that no voltage is charged in capacitor 61, the activate signal on terminal ACT of low frequency transmitter/receiver 50 switches the battery 65 voltage, provided at terminal VBAT, to connect through connections VCC to the level converter 56 which maintains the correct input and output signal voltage levels under all voltage supply levels.

When the end of burst, the end of the transmission from communication processor 11, measured by end of burst detector 54 lasts for a certain time such as, for example, a period of 1.9 milliseconds (1.9 ms), a "timeout" or response signal is generated in accordance with the disclosure above for transmission to communication processor 11. Divider 58 counts the radio frequency oscillations regenerated by clock regenerator 57 during the end of burst period to determine when the response or "timeout" signal is to be generated and switches the battery voltage, terminal VBAT, to the resonant circuit 60 to increase the transmission frequency amplitude and, therefore, to increase the transmission reading distance and the signal robustness against noise or other interference. Thus, similar to the enhanced reception distance, the distance over which data may be transmitted by transponder 15 of this invention using frequency shift keying (FSK) is enhanced when compared to the distance possible when a transponder operating in the passive mode is used. The radio frequency transmitter 16 transmits the signature and serial number with a command that the communication processor 11 accept the parallel low frequency response as a backup and as a security check. This dual signal, the parallel transmission of a radio frequency signal and a low frequency signal, enhances the security against noise and manipulation of the command signals.

Operation may also be enhanced by using transmitter/receivers as the radio frequency receiver 12 in communication processor 11 and radio frequency transmitter 16 in transponder 15. When radio frequency transmitter/receivers are used, both the radio frequency communication and the low frequency communication between communication processor 11 and transponder 15 will be two way transmissions, further enhancing the security against noise and manipulation of the command signals.

The road vehicle keyless entry system 10 may also be used to replace the ignition key of the vehicle. When the vehicle operator has entered the vehicle and wishes to start the engine, the operator will initiate a new command process with a manual stimulus of a push button on or near the vehicle dash board, for example. This stimulus initiates a new challenge/response phase via the low frequency transmitter/receivers. Operation of the keyless entry system 10 after receipt of the low frequency signal is as described above.

Figure 4:
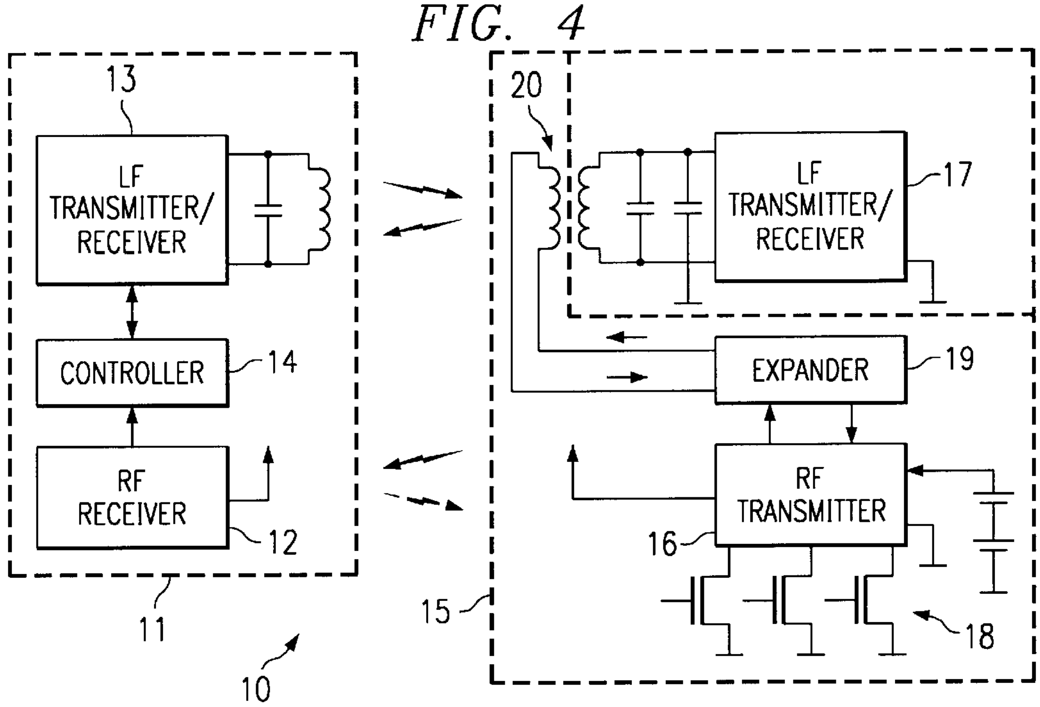
FIG. 4 is a block schematic illustrating modifications to the remote transponder of the road vehicle keyless entry system of FIG. 1.

Turning now to FIG. 4, a block schematic illustrates modifications to the remote transponder 15 of the road vehicle keyless entry system 10 of FIG. 1. Communication processor 11 is located within the vehicle and miniaturized transponder 15 is a remote unit which may be carried by the vehicle operator. The apparatus and operation of communication processor 11 and transponder 15 are as described in regard to FIG. 1 above except that the serial input/output interface circuitry between radio frequency transmitter 16 and low frequency transmitter/receiver 17 is replaced by driver/demodulator circuit 19 and coupling coil 20 to provide for the contactless transfer of data between the two circuits. In this embodiment, battery voltage is provided to radio frequency transmitter 16 and voltage is transferred to low frequency transmitter/receiver 17 by signal transmission through coupling coil 20. Commands are initiated by the manual stimulation of one of the plurality of push buttons 18 on radio frequency transmitter 16 which transmits the command to communication processor 11 and at the same time transfers the command data to low frequency transmitter/receiver 17. As described above, it is contemplated that radio frequency receiver 12 and radio frequency transmitter 16 may be transmitter/receivers allowing two way radio frequency communication in addition to the two way low frequency communication. It is, thus, possible to initiate commands by manual stimulation of push buttons, similar to push buttons 18, located on communication processor 11. Communication processor 11 would transmit the command to radio frequency transmitter 16, which would then be a transmitter/receiver, and it would request data from low frequency transmitter/receiver 17 to respond to the command from communication processor 11. Solid and dotted lines are shown in FIG. 4 to illustrate the two way flow of information by the use of radio frequency transmitter/receivers. The commands and data are transferred to low frequency transmitter/receiver 17 via coupling coil 20 which is driven by driver/demodulator circuit 19. The response, also via coupling coil 20, from low frequency transmitter/receiver 17, the signature, serial number and status, are demodulated by driver/demodulator circuit 19 for reading by radio frequency transmitter 16. Operation of communication processor 11 and transponder 15 are otherwise as described in regard to FIG. 1 above. This embodiment of the invention may be especially useful if it is desired to separate the command function provided by radio frequency transmitter 16, which initiates all commands by operation of one of the push buttons 18, from the communication function provided by low frequency transmitter/receiver 17, which provides two way communication for the transfer and verification of data between transponder 15 and communication processor 11. Radio frequency transmitter 16 and low frequency transmitter/receiver 17 may, thus, be in separate compact cases, allowing separate use of a passive transponder for operation over short distances, separate use of an active, battery powered radio frequency transponder for remote control functions over greater distances and combined use of the passive and active transponder functions over the full desired operating range, thus allowing adaption of the transponder size to the size the vehicle operator is willing to carry.

Figure 5:
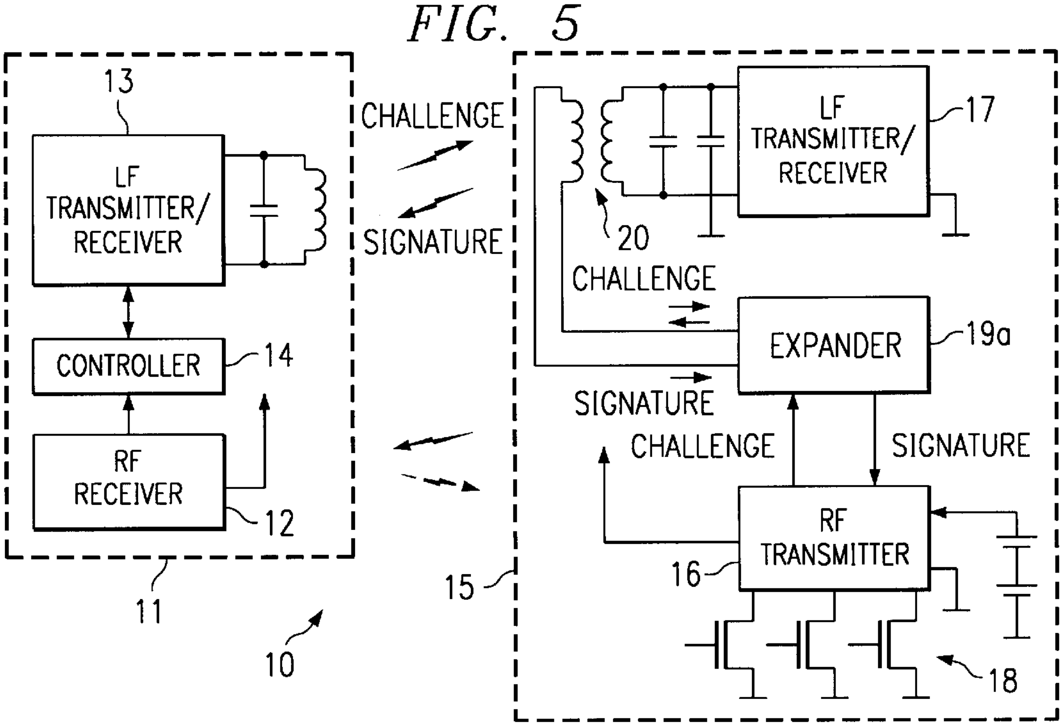
FIG. 5 is a block schematic illustrating modifications to the remote transponder of the road vehicle keyless entry system of FIG. 4.

FIG. 5 is a block schematic illustrating modifications to the remote transponder of the road vehicle keyless entry system of FIG. 4. In FIG. 5 the driver/demodulator circuit 19 interface of FIG. 4 is replaced or complimented by a write distance expander interface circuit 19*a* which cooperates with radio frequency transmitter 16 and low frequency transmitter/receiver 17 to provide a transponder 15 that is operable at an increased distance between transponder 15 and communication processor 11 with low frequency transmitter/receiver 17 operating in the passive mode, that is without a voltage directly supplied by a battery.

Road vehicle keyless entry system 10 has communication processor 11 and transponder 15. The functional elements and operation of communication processor 11 are described above. Transponder 15 has a low frequency transmitter/receiver 17 that operates on a low frequency such as, for example, 134.2 kilohertz (134.2 kHz) to provide two way communication, a challenge and encrypted response, with communication processor 11. Transponder 15 also has a radio frequency transmitter 16 that operates on a radio frequency such as, for example, 433 megahertz (433 MHz). Radio frequency transmitter 16 is equipped with a battery and the range in which transponder 15 can receive the low frequency signal is increased by write distance expander interface circuit 19*a*. The radio frequency transmitter 16 and low frequency transmitter/receiver 17 must be in a common housing for operation over extended distances, but may be separated from one another while providing basic operations at shorter operating ranges.

The radio frequency transmitter 16 is typically used to provide security functions such as, for example, light switching, alarm arming and disarming and similar functions. The low frequency transmitter/receiver 17 is typically used in the passive operating mode to provide keyless entry and immobilization functions at short range, for example at distances less than one meter (1 m). When a request or command is made by the manual operation of one of a plurality of push buttons 18 on transponder 15 or by a mechanical switch such as the vehicle door handle, a challenge or interrogation, a random number, is transmitted from communication processor 11 using a ferrite or air coil antenna and pulse pause modulation at a frequency of, for example, 134.2 kilohertz (134.2 kHz) to the low frequency transmitter/receiver 17 of transponder 15. Low frequency transmitter/receiver 17 encrypts the challenge using a secret encryption key held in its memory (not readable) to produce a signature and responds by transmitting the encrypted challenge, its signature, and the transponder serial number to the communication processor 11 using a frequency shift keying (FSK), frequency modulation, signal at a frequency of, for example, 134.2 kilohertz (134.2 kHz). If the distance between communication processor 11 and transponder 15 is too far, this communication will fail. To achieve a greater functional range, the write distance expander 19*a* interface circuit is provided.

Figure 6:
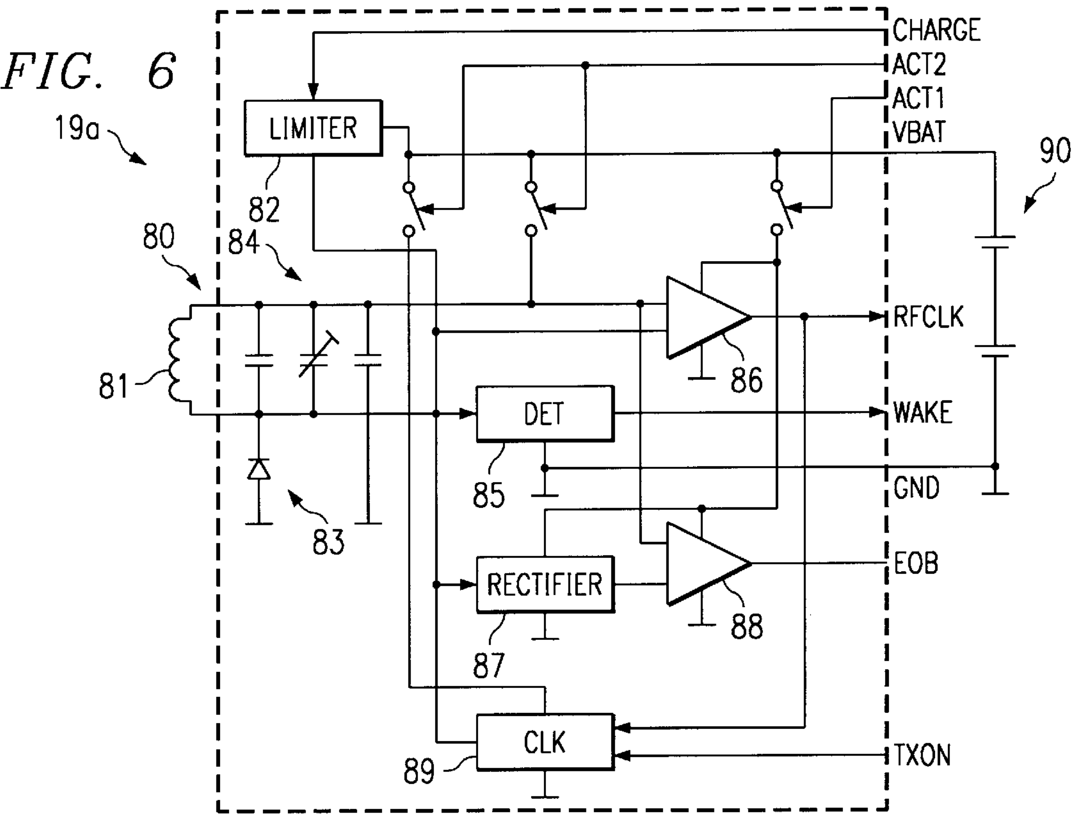
FIG. 6 is a block schematic illustrating the functional elements and data paths of one embodiment of the write distance expander of the remote transponder of FIG. 5.
Figure 7:
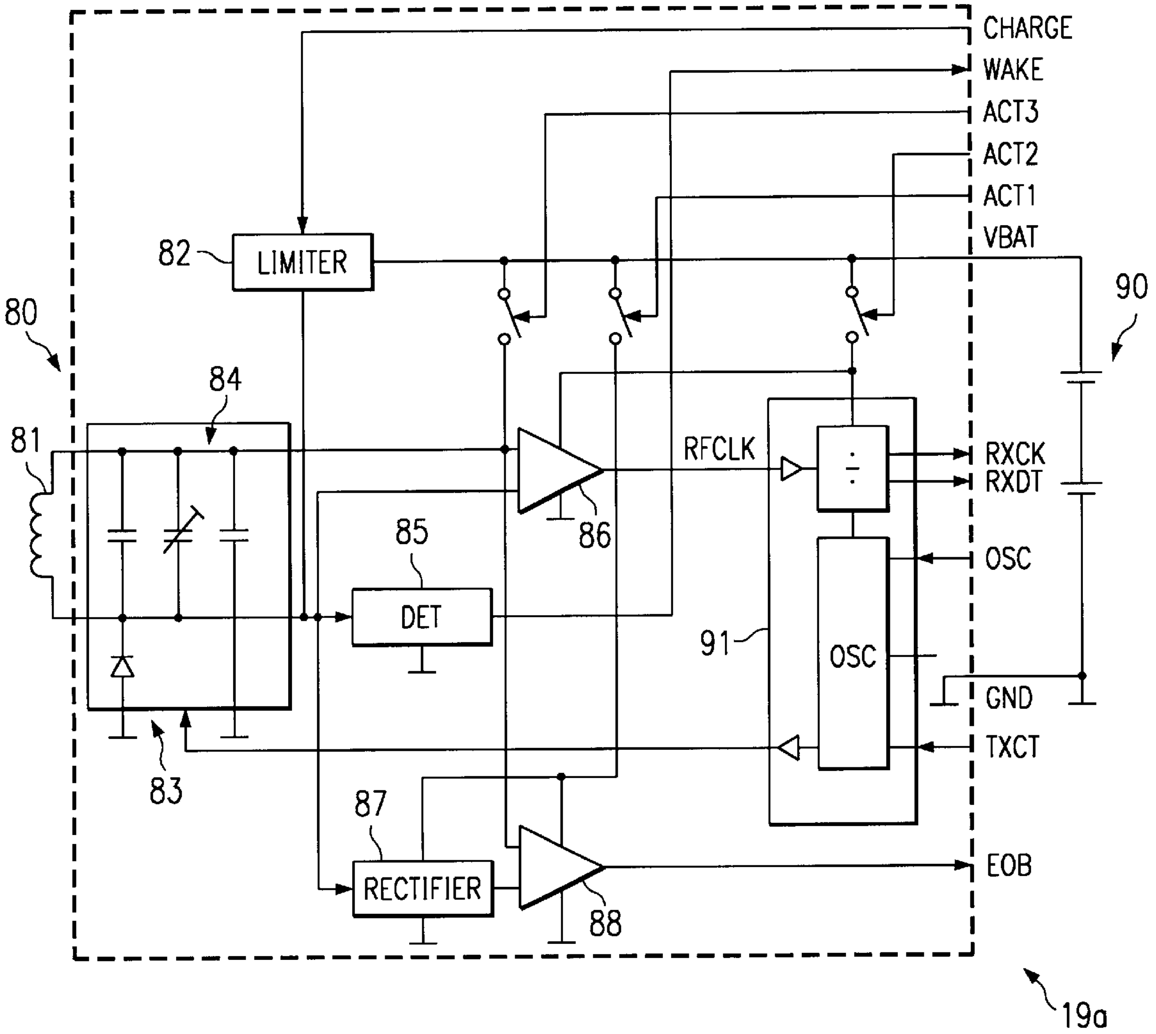
FIG. 7 is a block schematic illustrating the functional elements and data paths of a second embodiment of the write distance expander of the remote transponder of FIG. 5.

One embodiment of the write distance expander 19*a* is shown in FIG. 6 in a block schematic illustrating the expander's functional elements and data paths. A block schematic is used in FIG. 7 to illustrate the functional elements and data paths of a second embodiment of the write distance expander 19*a*.

Write distance expander 19*a* interface circuit includes resonant circuit 80 which consists of coil 81, which also serves as a coupling coil, and a capacitor tuned to a frequency of 134.2 kilohertz (134.2 kHz); radio frequency voltage limiter 82 with a battery charge circuit; diode 83 connected to charge capacitor 84; threshold detector 85; clock regenerator 86, an operational amplifier used as a comparator; envelope rectifier 87; end of burst detector 88; and a 134.2 kilohertz (134.2 kHz) clock generator module 89 which may, for example, be a pluck logic module or a separate oscillator with a divider gated by activation signal TXCT.

Coil 81, which is, for example, a small ferrite or air coil, is located proximate the antenna of low frequency transmitter/receiver 17 at a position in which the coil 81 can receive the radio frequency signals from communication processor 11 and the resonant circuit of low frequency transmitter/receiver 17. The write distance expander 19*a* resonant circuit 80 has a high quality factor to achieve a radio frequency voltage amplitude of at least about 1 to 2 volts at the desired maximum reading distance between the transponder 15 and communication processor 11. When communication processor 11 transmits a challenge to transponder 15 and the distance between the two devices is too great, the low frequency transmitter/receiver 17 will not function properly because the challenge is not received or the signal is too weak. If the challenge is not properly received by low frequency transmitter/receiver 17, encryption of the challenge is not started and no response will be transmitted to the communication processor 11. The write distance expander 19*a* circuit has a threshold detector 85 which detects the radio frequency voltage increase during the charge phase, the period in which the radio frequency signal from communication processor 11 is used to charge charge capacitor 84. The threshold detector 85 activates the supply voltage for the active devices and turns on the controller within the radio frequency transmitter 16. The threshold detector 85 may be an N-channel FET with low gate source-voltage, a circuit that does not consume power as long as the FET is not in the conductive state. The threshold detector 85 can also be an active device which consumes a certain amount of standby current from the battery. The pulses of the FET, or of the active device, can be used to trigger a retriggerable monoflop or can be used directly to turn on the controller within radio frequency transmitter 16 which activates the power supply to the write distance expander 19*a*. The oscillation of the write distance expander is rectified by diode 83 and filtered by charge capacitor 84 to provide a reference voltage for the comparators, clock regenerator 86 and end of burst detector 88.

Figure 8:
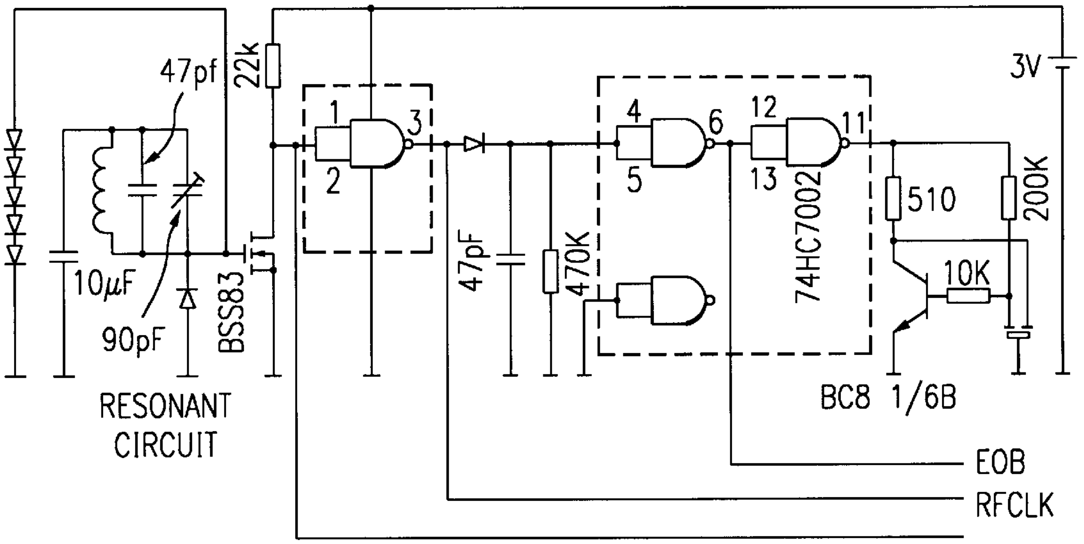
FIG. 8 is a block schematic illustrating a write distance expander.

During transmission of the command and the challenge to the low frequency transmitter/receiver 17, the radio frequency signal is pulsed and the length of the pulse pauses are the indication for a low or a high bit. The envelope rectifier 87 detects the pulse pauses by rectifying the output of the clock regenerator 86. The envelope rectifier 87 output signal is compared to the voltage reference level by the end of burst detector 88 and this signal is conducted to the controller of radio frequency transmitter 16. The controller monitors the output from end of burst detector 88, detects the length of the pulse pauses and determines whether a low bit or a high bit is received. Threshold detector 85, envelope rectifier 87 and comparator 88 may be combined in the simplest case using a field effect transistor (FET) with low gate/source voltage as shown in FIG. 8, an illustration of a simple write distance expander. When an encryption command is received, the challenge is received and stored in controller memory. The controller of radio frequency transmitter 16 switches the voltage provided by battery 90 to the clock regenerator 86 when the response from the low frequency transmitter/receiver 17 is expected and clock regenerator 86 amplifies and limits the radio frequency signal oscillation and generates a digital clock signal. This clock signal is conducted directly to the controller of radio frequency transmitter 16 or to the controller through a digital or analog demodulator circuit 91 if the controller is not capable of demodulating the signal. The controller checks the frequency shift keying (FSK) modulated response from the low frequency transmitter/receiver 17 to determine whether it is valid and complete. The encrypted response to the challenge from the communication processor 11 is transmitted by the low frequency transmitter/receiver 17 and the response, the signature, status and other desired information, may be sent in parallel by the radio frequency transmitter 16 to confirm and authenticate the response. When only the challenge, but no response from the low frequency transmitter/receiver 17, is detected by the controller of radio frequency transmitter 16, the controller transfers the challenge stored in memory to the low frequency transmitter/receiver 17 using the 134.2 kilohertz (134.2 kHz) clock generator 89 which may be a pluck logic circuit or a gated oscillator with divider as shown in the demodulator circuit 91. When low frequency transmitter/receiver 17 receives the challenge, it will generate an encrypted signature from the challenge and will transmit the encrypted signature at a frequency of 134.2 kilohertz (134.2 kHz) as the response to communication processor 11. This response will also be transferred to radio frequency transmitter 16 and will be transmitted at a radio frequency of 433 megahertz (433 MHz) to communication processor 11 in parallel with the low frequency transmission of the response. The radio frequency voltage limiter circuit 82 necessary to protect the components can be used to charge battery 90. If the threshold detector 85, and the controller of radio frequency transmitter 16, detects a continuous radio frequency signal for a long period of time, then radio frequency voltage limiter 82 will switch the voltage to a higher level for use to charge battery 90. Depending upon the low frequency voltage initiated in the write distance expander 19*a* resonant circuit 81 (antenna size) and the threshold detector level sensitivity, distances of from about 1 meter (1 m) to about 2 meters (2 m) between transponder 15 and communication processor 11 can be bridged for remote keyless entry communications. This greater or expanded signal reception distance combined with the greater transmission distance for radio frequency remote control transmitter 16, greater than 10 meters (>10 m) allows the operator to gain access to the vehicle or authorize other vehicle actions from a greater distance or without removing the transponder 15 from the pocket.

In addition to the described function, write distance expander 19*a* may also be used as a low cost radio frequency module with receive and transmit capabilities. Such modules could be used in transponders useful over short distances.

In view of the foregoing description, it will be seen that several advantages are attained by the present invention.

Although the foregoing includes a description of the best mode contemplated for carrying out the invention, various modifications could be made in the constructions herein described and illustrated without departing from the scope of the invention. It is intended that all material contained in the foregoing description or shown in the accompanying drawing should be interpreted as illustrative rather than limiting and that the invention should be defined only in accordance with the following claims.

What is claimed is:

1. A road vehicle keyless entry system comprising an in-vehicle communication processor and a remote, miniaturized transponder;

the communication processor having a radio frequency receiver, a low frequency transmitter/receiver for transmitting low frequency signals and a controller for reading the signals sent and received by the low frequency transmitter/receiver; and the transponder having a radio frequency transmitter that transmits a signal to the radio frequency receiver of said communication processor upon receipt of a manual stimulus thereat and a low frequency transmitter/receiver for reading low frequency signals received from the communication processor and transmitting an encrypted response to the communication processor.

2. The road vehicle keyless entry system of claim 1 wherein the radio frequency transmitter of the transponder and the radio frequency receiver of the communication processor send and receive a signal having a frequency of 433 megahertz.

3. The road vehicle keyless entry system of claim 1 wherein the low frequency transmitter/receivers of the transponder and the communication processor send and receive a signal having a frequency of 134.2 kilohertz.

4. The road vehicle keyless entry system of claim 3 wherein the low frequency transmitter/receiver of the transponder operates in a passive mode.

5. The road vehicle keyless entry system of claim 1 wherein the transponder supplements or replaces the vehicle door and ignition keys, signals from the transponder being received by the communication processor that, after reception and verification of access codes, authorizes unlocking the vehicle and performance of vehicle related initialization functions such as seat, seat belt and vehicle mirror adjustments.

6. The road vehicle keyless entry system of claim 1 wherein the transponder further includes an interface circuit and a coupling coil to provide contactless transfer of data between the radio frequency transmitter and the low frequency transmitter/receiver.

7. The road vehicle keyless entry system of claim 6 wherein the transponder radio frequency transmitter and low frequency transmitter/receiver are in separate cases.

8. The road vehicle keyless entry system of claim 1 wherein the communication processor radio frequency receiver and the transponder radio frequency transmitter are radio frequency transmitter/receivers capable of two way transmissions between the communication processor and the transponder.

9. A road vehicle keyless entry system comprising an in-vehicle communication processor and a remote transponder;

the communication processor having a radio frequency receiver, a low frequency transmitter/receiver and a controller capable of reading the signals sent and received by the low frequency transmitter/receiver; and the transponder having a radio frequency transmitter that transmits a signal to the radio frequency receiver of said communication processor upon receipt of a manual stimulus, a low frequency transmitter/receiver capable of reading signals received from the communication processor and transmitting an encrypted response to the communication processor and an interface circuit and coupling coil to provide contactless transfer of data between the radio frequency transmitter and the low frequency transmitter/receiver.

10. The road vehicle keyless entry system of claim 9 wherein the radio frequency transmitter of the transponder and the radio frequency receiver of the communication processor send and receive a signal having a frequency of 433 megahertz.

11. The road vehicle keyless entry system of claim 9 wherein the low frequency transmitter/receivers of the transponder and the communication processor send and receive a signal having a frequency of 134.2 kilohertz.

12. The road vehicle keyless entry system of claim 9 wherein the manual stimulus is the manual actuation of one of a plurality of push buttons.

13. The road vehicle keyless entry system of claim 9 wherein the communication processor radio frequency receiver and the transponder radio frequency transmitter are radio frequency transmitter/receivers capable of two way transmissions between the communication processor and the transponder.

14. A secure road vehicle keyless entry system comprising an in-vehicle communication processor and a remote transponder, the communication processor and transponder communicating in parallel paths, a first path being a radio frequency transmission from the transponder to the communication processor and a second path being a low frequency, encrypted two way transmission between the transponder and the communication processor.

15. The secure road vehicle keyless entry system of claim 14 wherein the radio frequency transmission and the low frequency transmission are compared for authentication of the transmitted data.

16. The secure road vehicle keyless entry system of claim 14 wherein the radio frequency transmission is a two way transmission between the transponder and the communication processor.

17. A method of vehicle keyless entry comprising the steps of:

providing an in-vehicle communication processor and a remote, miniaturized transponder, the communication processor having a radio frequency receiver, a low frequency transmitter/receiver for transmitting low frequency signals and a controller for reading the signals sent and received by the low frequency transmitter/receiver and the transponder having a radio frequency transmitter that transmits a signal to the communication processor upon receipt of a manual stimulus thereat and a low frequency transmitter/receiver for reading low frequency signals received from the communication processor and transmitting an encrypted response to the communication processor;

providing said manual stimulus to cause said transponder to send an RF signal to said communication processor and sending a low frequency signal to said low frequency transmitter/receiver at said communication processor in response to said manual stimulus;

then sending a low frequency signal from said low frequency transmitter/receiver at said communication processor to said transmitter/receiver at said transponder in response to at least one of said signals from said transponder to said communication processor; and then sending a signal from said transponder to said communication processor in response to said signal from said communication processor to said transponder.

18. The method of claim 17 wherein said signal from said low frequency transmitter/receiver at said communication processor to said low frequency transmitter/receiver at said transponder is an encoded signal.

19. The method of claim 18 wherein said encoded signal is a rolling coded signal.

20. The method of claim 17 wherein said signal from said low frequency transmitter/receiver at said transponder to said low frequency transmitter/receiver at said communication processor is an encoded signal.

21. The method of claim 18 wherein said signal from said low frequency transmitter/receiver at said transponder to said low frequency transmitter/receiver at said communication processor is an encoded signal.

22. The method of claim 20 wherein said encoded signal is a rolling coded signal.

23. The method of claim 21 wherein said encoded signal is a rolling coded signal.

* * * * *

UNITED STATES PATENT AND TRADEMARK OFFICE

CERTIFICATE OF CORRECTION

PATENT NO. : 6,323,566 B1

DATED : November 27, 2001

INVENTOR(S) : Herbert Meier and Michael Knebelkamp

It is certified that error appears in the above-identified patent and that said Letters Patent is hereby corrected as shown below:

<u>Title page,</u>

Item [75], Inventors, should be as follows:

-- [75] Inventors: Herbert Meier, Moosburg (DE)
Michael Knebelkamp, Freising (DE) --

Signed and Sealed this

Second Day of March, 2004

JON W. DUDAS

*Acting Director of the United States Patent and Trademark Office*